(12) United States Patent
Eisenbeiss et al.

(10) Patent No.: US 10,704,978 B2
(45) Date of Patent: Jul. 7, 2020

(54) WHEEL-FORCE DYNAMOMETER FOR MEASURING TIRE FORCES

(71) Applicant: ZF Friedrichshafen AG, Friedrichshafen (DE)

(72) Inventors: Jens Eisenbeiss, Fuerstenzell (DE); Roland Bösl, Neuburg am Inn (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 111 days.

(21) Appl. No.: 15/781,766

(22) PCT Filed: Nov. 8, 2016

(86) PCT No.: PCT/EP2016/076897
§ 371 (c)(1),
(2) Date: Jun. 6, 2018

(87) PCT Pub. No.: WO2017/097514
PCT Pub. Date: Jun. 15, 2017

(65) Prior Publication Data
US 2019/0056283 A1    Feb. 21, 2019

(30) Foreign Application Priority Data
Dec. 8, 2015   (DE) .................. 10 2015 224 638

(51) Int. Cl.
*G01M 1/24*        (2006.01)
(52) U.S. Cl.
CPC .................. *G01M 1/24* (2013.01)

(58) Field of Classification Search
CPC ........ G01M 1/24; G01M 1/225; G01M 1/045; G01M 1/06; G01M 17/022
See application file for complete search history.

(56) References Cited

U.S. PATENT DOCUMENTS 3,948,095 A * 4/1976 Burgett ................... G01L 5/161
                                                          73/146
4,499,768 A * 2/1985 Madden ................ G01M 1/225
                                                          73/462

(Continued)

FOREIGN PATENT DOCUMENTS

CH         500 480      12/1970
DE       1 201 581 B     9/1965

(Continued)

OTHER PUBLICATIONS

German Search Report Corresponding to 10 2015 224 636.1 dated Oct. 7, 2016.

(Continued)

*Primary Examiner* — Helen C Kwok
(74) *Attorney, Agent, or Firm* — Davis & Bujold PLLC; Michael J. Bujold

(57) ABSTRACT

A wheel-force dynamometer (1) for measuring, via force sensors (6), force and torque that act upon a vehicle tire (2a) and a vehicle wheel (2). The vehicle wheel (2) is mounted to rotate by way of a wheel axle. The wheel-force dynamometer (1) is characterized in that the wheel axle is in the form of a rotor (3) which is hydrostatically mounted, axially fixed and able to rotate in the circumferential direction, in a rigid and positionally fixed housing (5).

15 Claims, 3 Drawing Sheets

(56) References Cited

U.S. PATENT DOCUMENTS

| | | | | |
|---|---|---|---|---|
| 4,555,956 | A | * | 12/1985 | Reich .................... G01L 3/108 73/862.321 |
| 4,726,690 | A | * | 2/1988 | Thelen .................... G01M 1/04 384/247 |
| 4,753,110 | A | | 6/1988 | Burchett et al. |
| 4,969,355 | A | * | 11/1990 | Doi .................... G01M 17/022 73/146 |
| 5,060,513 | A | * | 10/1991 | Rothamel ............. G01M 1/045 73/460 |
| 5,063,773 | A | | 11/1991 | Fujimori et al. |
| 5,689,069 | A | * | 11/1997 | Corghi .................. G01M 1/326 73/462 |
| 6,430,992 | B1 | * | 8/2002 | Goebel .................. G01M 1/28 73/471 |
| 2002/0124650 | A1 | * | 9/2002 | Matsumoto ........... G01M 1/045 73/460 |
| 2003/0213301 | A1 | * | 11/2003 | Buzzi .................... G01M 1/045 73/462 |
| 2004/0003661 | A1 | * | 1/2004 | Rothamel ............ G01M 1/045 73/462 |
| 2012/0240677 | A1 | * | 9/2012 | Sotgiu .................. G01M 1/04 73/462 |
| 2013/0008249 | A1 | * | 1/2013 | Sotgiu .................. G01M 1/225 73/462 |
| 2016/0333888 | A1 | * | 11/2016 | Miyahara ................ G01M 1/04 |
| 2018/0372568 | A1 | * | 12/2018 | Eisenbeiss ............... G01L 5/20 |

FOREIGN PATENT DOCUMENTS

| | | |
|---|---|---|
| DE | 1 281 713 B | 10/1968 |
| DE | 36 12 599 A1 | 10/1987 |
| DE | 690 23 313 T2 | 3/1996 |
| DE | 198 44 975 A1 | 3/2000 |
| DE | 100 04 419 A1 | 12/2000 |
| DE | 100 44 291 A1 | 9/2001 |
| DE | 102 60 000 A1 | 7/2004 |
| DE | 10 2008 034 484 A1 | 1/2010 |
| EP | 0 192 789 A1 | 9/1986 |
| EP | 0 735 356 A2 | 10/1996 |
| EP | 1 239 275 A2 | 9/2002 |
| EP | 2 187 193 A2 | 5/2010 |
| EP | 2 602 602 A1 | 6/2013 |
| WO | 2015/146735 A1 | 10/2015 |

OTHER PUBLICATIONS

German Search Report Corresponding to 10 2015 224 638.8 dated Oct. 17, 2016.

International Search Report Corresponding to PCT/EP2016/076898 dated Feb. 6, 2017.

International Search Report Corresponding to PCT/EP2016/076897 dated Feb. 1, 2017.

Written Opinion Corresponding to PCT/EP2016/076898 dated Feb. 6, 2017.

Written Opinion Corresponding to PCT/EP2016/076897 dated Feb. 1, 2017.

* cited by examiner

WHEEL-FORCE DYNAMOMETER FOR MEASURING TIRE FORCES

This application is a National Stage completion of PCT/EP2016/076897 filed Nov. 8, 2016, which claims priority from German patent application serial no. 10 2015 224 638.8 filed Dec. 8, 2015.

FIELD OF THE INVENTION

The invention relates to a wheel-force dynamometer.

BACKGROUND OF THE INVENTION

From DE 102 60 000 B4 by the present applicant a wheel-force dynamometer for measuring tire forces is known, wherein a vehicle wheel is fixed onto a wheel axle which is mounted by roller bearings in a hollow shaft. The hollow shaft is mounted hydrostatically in a housing fixed to a frame and has a collar on which force sensors for the measurement of forces and torques are arranged. The forces acting on the wheel are thus transmitted via the wheel axle to the hollow shaft, which for its part "floats" in a frictionless manner by hydrostatic means in the housing. During the measurement of tire forces by a wheel-force dynamometer, measurement errors can occur, which are determined by the design of the measuring device and its vibration behavior.

SUMMARY OF THE INVENTION

An objective of the invention is to propose an improved wheel-force dynamometer.

According to the invention, this objective is achieved by the wheel-force dynamometer according to the independent claims. Advantageous design features emerge from the subordinate claims.

The invention relates to a wheel-force dynamometer for the measurement by means of force sensors of forces and torques acting on a vehicle tire and a vehicle wheel, wherein the vehicle wheel is mounted and can rotate on a wheel axle. The wheel-force dynamometer according to the invention is characterized in that the wheel axle is in the form of a compact rotor which is mounted axially fixed and able to rotate in the circumferential direction in a rigid and positionally fixed housing. Since the wheel axle is no longer made solid and mounted inside a hollow shaft—as in the prior art—but, according to the invention, is in the form of a compact rotor held in a housing, by virtue of the larger diameter and annular cross-section of the housing, a maximum modulus of resistance and thus high rigidity is achieved. Moreover the mass of the wheel axle is reduced. Furthermore a housing that is rigid and does not rotate is provided, which accommodates the compact rotor. The positionally fixed housing in combination with the compact rotor provides an exceptionally rigid wheel mounting which deforms very little under the action of the tire forces that occur during the measurements. The invention is based on the recognition that a reason for measurement errors relates to a relatively low natural frequency of the measurement device compared with the measurement frequencies which are desirable in the context of a so-termed High Speed Uniformity (HSU) measurement. Thanks to the compact rotor and rigid housing that constitute the wheel mounting according to the invention, high rigidity and hence a relatively high natural frequency of the wheel-force dynamometer are obtained. The occurrence of resonances at the measurement frequencies can therefore be avoided, since the measurement frequencies are lower than the natural frequencies of the wheel mounting. This results in optimized transfer functions, which show smaller amplitude increases and smaller phase shifts.

According to a preferred embodiment of the invention, it is provided that the housing comprises a housing body and a housing lid. Thus, the compact rotor can be clamped firmly between the housing body and the housing lid. This results in comparatively higher rigidity with only low mass, which in turn results in higher natural frequencies. Furthermore, the housing can then be opened so as to position the compact rotor in the housing or remove it therefrom. In particular, this simplifies maintenance operations. The housing lid can be fixed onto the housing body for example by means of screw connections.

According to a further preferred embodiment of the invention, it is provided that the compact rotor has an external collar. Advantageously, the external collar provides a suitable point of engagement for clamping or mounting the compact rotor in the housing in an axially fixed, yet circumferentially rotatable manner. At the same time this contributes toward increasing the rigidity.

In a further preferred embodiment of the invention, it is provided that the compact rotor comprises a rotor head and a rotor ring, wherein the rotor head and the rotor ring each have a radial circumference variation such that in the area of an axial middle of the rotor they taper or thicken in a conical manner. The oblique flanks of this radial circumference variation provide an alternative point of engagement for clamping or mounting the compact rotor in the housing in an axially fixed, yet circumferentially rotatable manner.

According to a particularly preferred embodiment of the invention, it is provided that the housing lid has an opening through which a rotor head of the rotor is passed. In that way the vehicle tire can be attached to the rotor head while the rotor is held and can rotate in the housing.

In another preferred embodiment of the invention, it is provided that the housing body is supported on a positionally fixed supporting structure. This realizes the concept of a cantilevered beam, with high rigidity and a high natural frequency.

According to a further preferred embodiment of the invention, it is provided that the force sensors are arranged between the housing body and the supporting structure. Forces or torques produced by rotation of the vehicle tire or vehicle wheel spread into the housing. By way of the housing body these forces or torques are transmitted to and detected by the force sensors. In this context a plurality of in part different force sensors can be provided for measuring the tire forces.

In a particularly preferred embodiment of the invention, it is provided that the wheel-force dynamometer also comprises slide bearings arranged between the rotor and the housing. These ensure that the rotor can rotate relative to the housing with very little friction.

According to a quite especially preferred embodiment of the invention it is provided that a first slide bearing is in the form of a radial bearing and a second and a third slide bearing are in each case in the form of axial bearings. This increases the rigidity of the bearing design while at the same time ensuring low-friction rotation of the rotor relative to the housing.

In an also very particularly preferred embodiment of the invention, it is provided that a first and a second slide bearing are made in the form of conical bearings. This too increases the rigidity of the bearing system while at the same time ensures low-friction rotation of the rotor relative to the housing, and at the same time a minimum number of slide bearings are needed, namely just two slide bearings.

According to an also particularly preferred embodiment of the invention, it is provided that the slide bearings are in the form of hydrostatic slide bearings. In hydrostatic bearings the necessary lubricant film is provided by an additional lubricant oil pump which delivers the lubrication oil under pressure into the lubrication gap. For a hydrostatic slide bearing this has the advantage that already on starting, i.e. at low rotational speeds, minimal friction occurs. A further advantage is that compared with conventional roller bearings a hydrostatic slide bearing has higher rigidity even at very low excitation frequencies. At higher frequencies, namely those relevant for the measurement of high speed uniformity (HSU), the rigidity is very much greater than with roller bearings. Accordingly the hydrostatic slide bearings also contribute substantially toward making the most of the rigidity potential of the wheel mounting, i.e. increasing the natural frequency of the measurement device.

In a further particularly preferred embodiment of the invention, it is provided that the second and the third slide bearings are arranged on opposite axial end faces of the collar. This too has been found particularly advantageous in relation to the rigidity of the mounting.

According to another preferred embodiment of the invention, it is provided that the rotor head of the rotor can be connected in a rotationally fixed manner to the vehicle wheel by means of wheel flange adapters. This provides a suitable option for the rigid and rotationally fixed connection of the vehicle wheel to be tested to the wheel-force dynamometer. In this case the wheel flange adapters are designed such that they enable wheel rims with different rim dimensions to be attached to the wheel-force dynamometer.

In a further preferred embodiment of the invention, it is provided that the housing body has a stud that engages in the rotor at least in the area of the collar. On the one hand this additionally supports the mounting of the rotor in the housing, and on the other hand it further increases the rigidity of the wheel-force dynamometer.

In another preferred embodiment of the invention, it is provided that a centering ring is arranged on the rotor head of the rotor. The centering ring ensures that the vehicle tire or vehicle wheel is centered relative to the rotor and the housing.

BRIEF DESCRIPTION OF THE DRAWINGS

Example embodiments of the invention are illustrated in the drawings and are described in greater detail below, so that further features and/or advantages can emerge from the description and/or the drawings, which show.

DETAILED DESCRIPTION OF THE PREFERRED EMBODIMENTS

Figure 1:
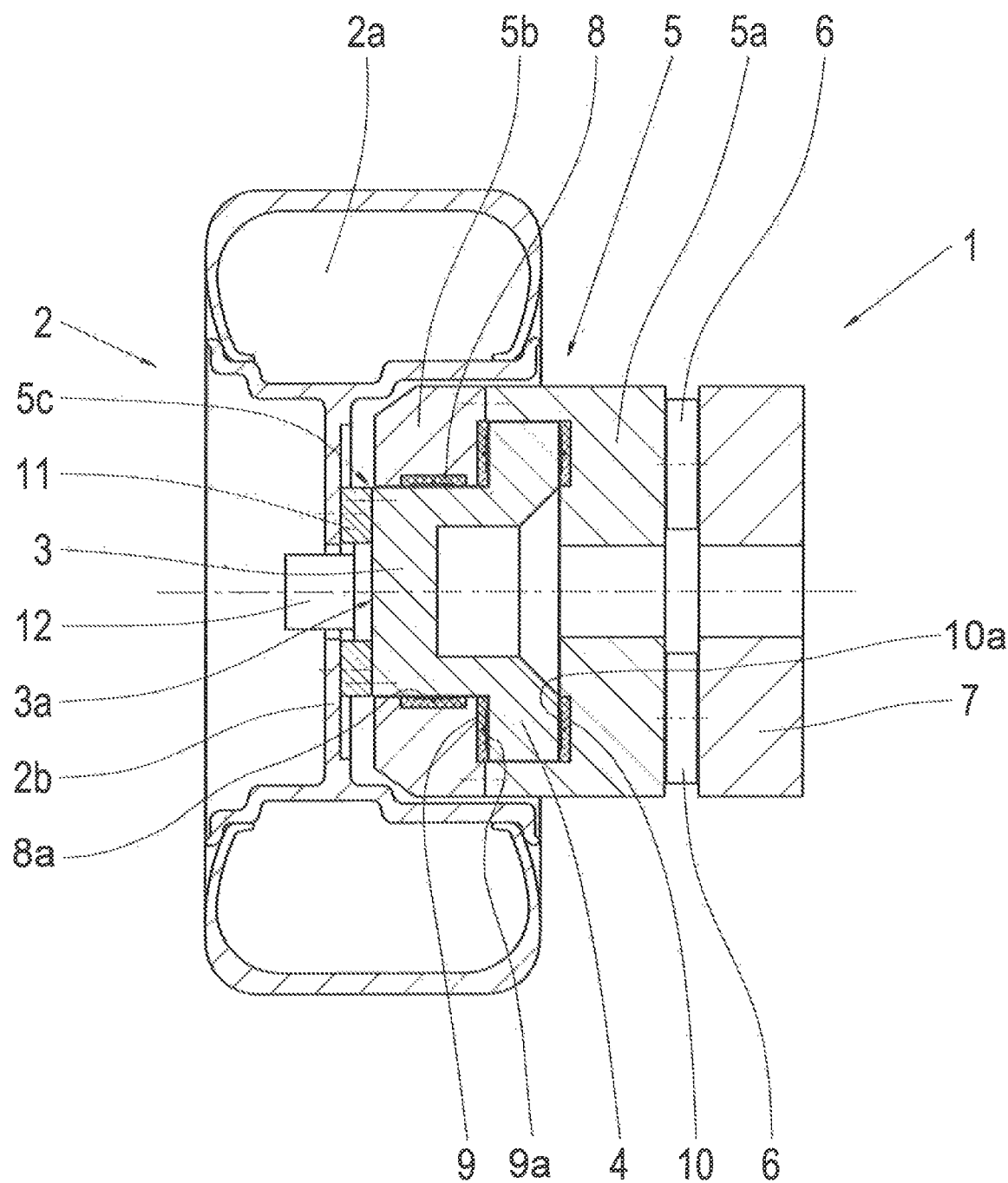
FIG. 1: A first example embodiment of a wheel-force dynamometer according to the invention.

FIG. 1 shows an example embodiment of a wheel-force dynamometer 1 according to the invention with a vehicle wheel 2 arranged on it and which comprises a vehicle tire 2a and a wheel rim 2b. The wheel-force dynamometer 1 shown is designed for the measurement of forces and torques imposed upon the vehicle wheel 2 during rotation thereof. In particular, the wheel-force dynamometer 1 is designed to measure the so-termed high speed uniformity (HSU) of the vehicle wheel 2. The wheel-force dynamometer 1 shown as an example is FIG. 1 has a rotor 3 with an outer collar 4, which is mounted so that it can rotate in a rigid and positionally fixed housing 5. In this example the housing 5 consists of a housing body 5a and a housing lid 5b, and due to its geometry and material properties it is particularly rigid. The housing body 5a and the housing lid 5b hold the rotor 3 axially fixed in the housing 5. By means of force sensors 6, the housing 5 is supported by its housing body 5a on a supporting structure 7. As can be seen, the housing lid 5b has an opening 5c through which a rotor head 3a of the rotor 3 passes. In addition the wheel-force dynamometer 1 comprises hydrostatic slide bearings 8, 9, 10 arranged between the rotor 3 and the housing 5, a first slide bearing 8 being in the form of a radial bearing whereas a second and third slide bearings 9, 10 are each axial bearings 9, 10. The first hydrostatic slide bearing 8 is arranged on an outer radial surface of the rotor 3, whereas the second hydrostatic slide bearing 9 and the third hydrostatic slide bearing 10 are arranged on opposite axial end faces of the collar 4. The first hydrostatic slide bearing 8 has on its radially inside circumference a lubrication pocket 8a which is supplied with lubricating oil from a pressure oil delivery system (not shown), so that a permanent lubricant film is maintained between the radial bearing and the outer radial surface of the rotor 3. In like manner the second and third hydrostatic slide bearings 9, 10 have on their axial surfaces facing one another lubrication pockets 9a, 10a which are also supplied with lubrication oil from a pressure oil delivery system (not shown), so that here too a permanent lubricant film is maintained between the axial bearings 9, 10 and the collar 4. The rotor head 3a of the rotor 3 is connected in a rotationally fixed manner to the vehicle wheel 2 by means of wheel flange adapters 11. In addition, on the rotor head 3a of the rotor 3 a centering ring 12 is arranged, which ensures that the vehicle wheel 2 is centered relative to the rotor 3.

The mounting of the vehicle wheel 2 on the positionally fixed supporting structure 7 is designed as a rigid assembly so that the wheel-force dynamometer 1 has a as high as possible natural frequency. Accordingly the measurement frequencies at which the forces and torques are determined in a HSU measurement are substantially lower than the natural frequency of the wheel-force dynamometer 1. Thus, resonances between the natural frequency of the wheel-force dynamometer 1 and the measurement frequencies can be largely avoided, so that resonance-related measurement errors such as amplitude increases or phase shifts are minimized.

For a measurement the vehicle wheel 2 rolls on a real or simulated road (not shown in FIG. 1), for example a rolling drum, and is loaded with a defined wheel load. The resulting forces and torques are transmitted by way of the wheel rim 2b to the rotor 3 and from there, via the hydrostatic slide bearings 8, 9, 10, to the housing 5. The housing 5 then transmits these forces and torques to the force sensors 6 by which the housing 5 is supported on the supporting structure 7. After the measurements, the vehicle wheel 2 is removed from the wheel-force dynamometer 1.

Figure 2:
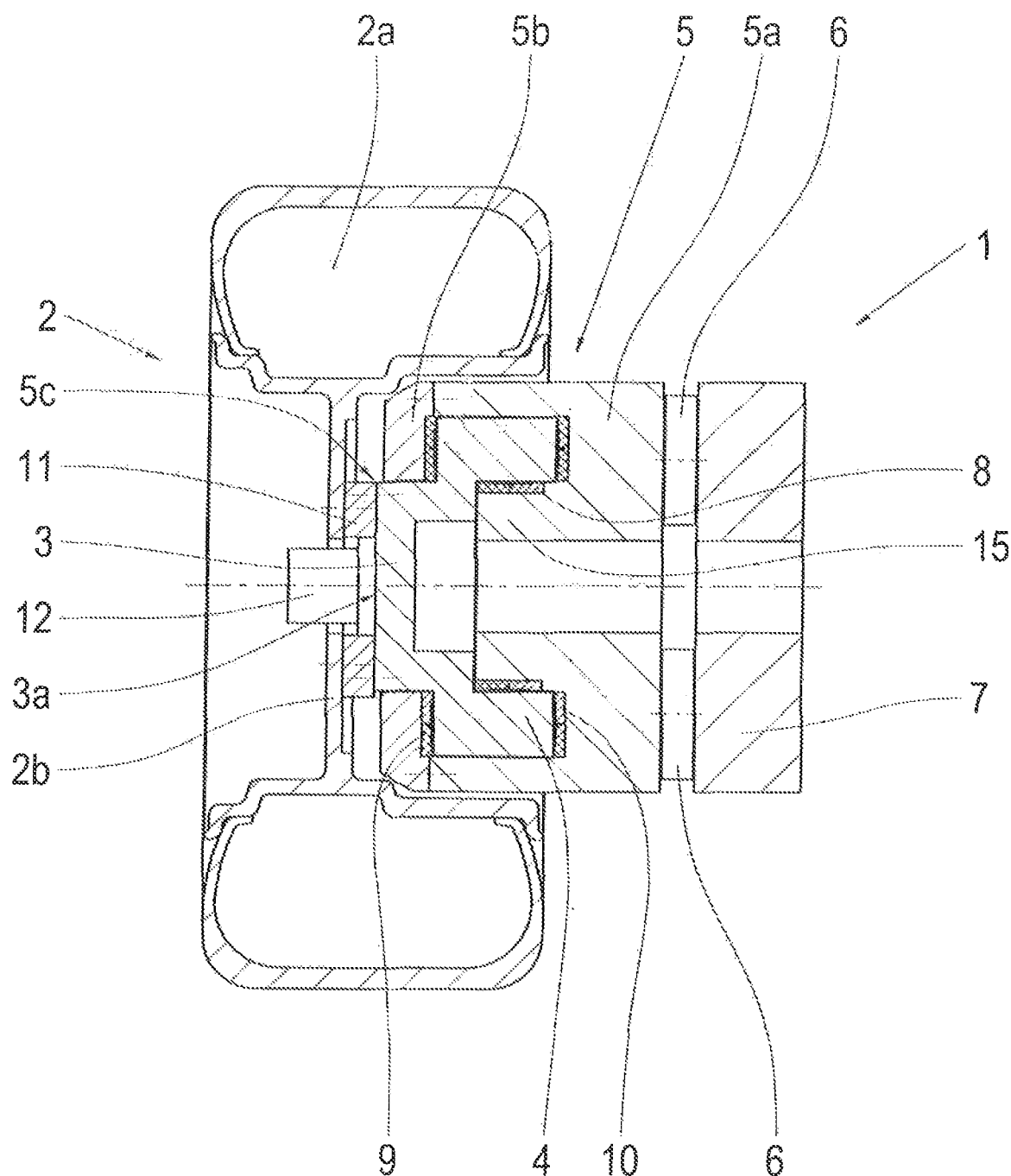
FIG. 2: A second example embodiment of a wheel-force dynamometer according to the invention.

FIG. 2 shows a further example embodiment of a wheel-force dynamometer 1 according to the invention. The example embodiment in FIG. 2 differs from the example embodiment in FIG. 1, first, in the design of the rotor 3 and the housing 5. As can be seen in FIG. 2, the axial length of the collar 4 is increased at the cost of the axial length of the rotor 3. Furthermore, the housing body 5a has a hollow stud 15 which engages in the rotor 3 in the area of the collar 4. Correspondingly the first slide bearing 8, which in this example is in the form of a hydrostatic radial bearing, is arranged between an inner radial surface of the collar 4 and the hollow stud 15. In the representation shown in FIG. 2 the hollow stud 15 is seated on the left axially against the rotor 3 and clamps it axially. Since the hollow stud 15 engages in the rotor 3 in that manner, the rigidity of this example embodiment of the wheel-force dynamometer 1 is improved still further.

The example embodiment of FIG. 2 also provides a comparatively high natural frequency of the wheel-force dynamometer 1 thanks to the rigid design of the wheel-force dynamometer 1. Thus, in this case too the measurement frequencies at which the forces and torques are determined in a HSU measurement are substantially lower than the natural frequency of the wheel-force dynamometer 1. Accordingly, resonances between the natural frequency of the wheel-force dynamometer 1 and the measurement frequencies can be largely avoided so that resonance-related measurement errors such as amplitude elevation or phase shift are minimized.

Figure 3:
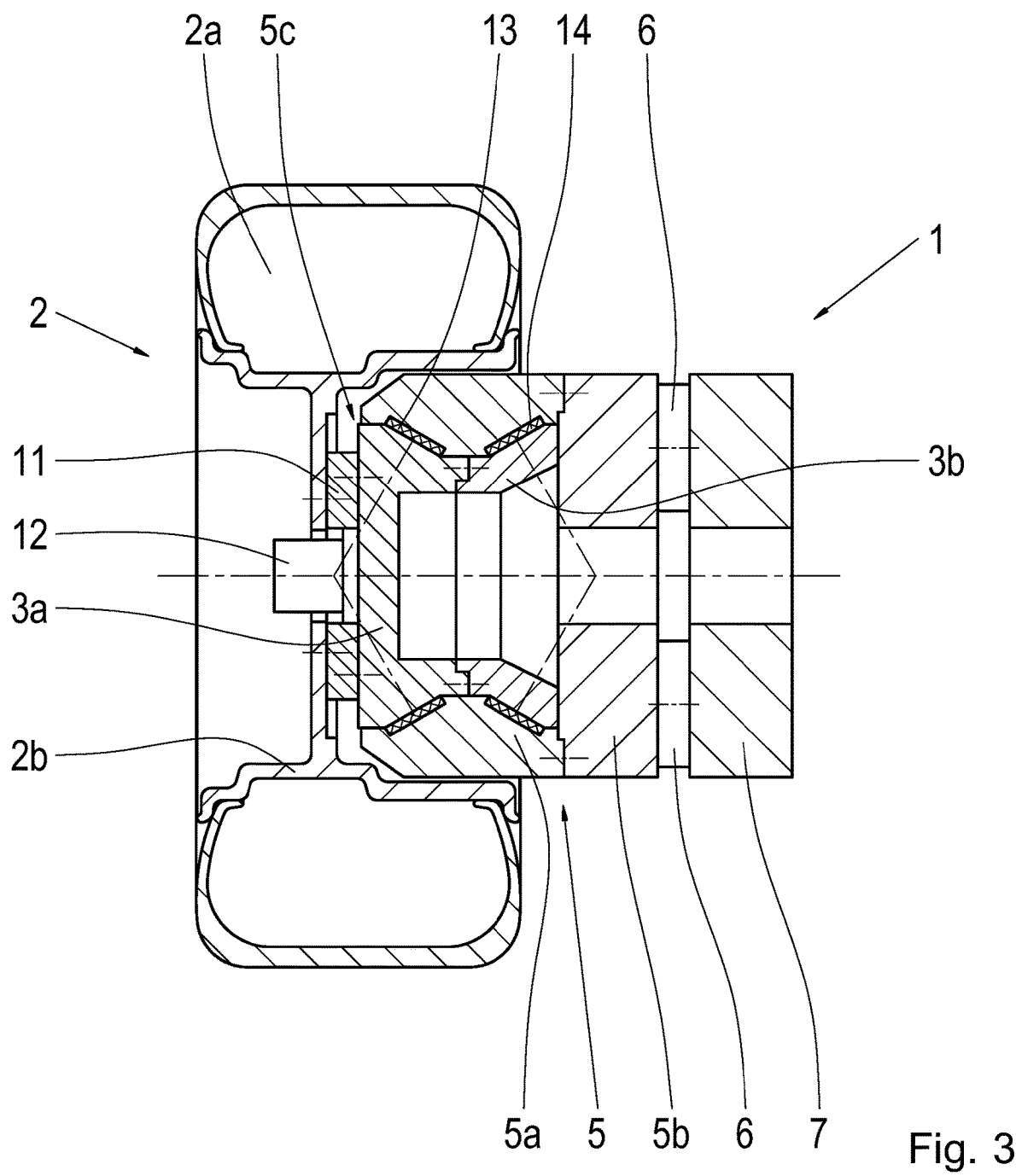
FIG. 3: A third example embodiment of a wheel-force dynamometer according to the invention.

FIG. 3 shows still another example embodiment of a wheel-force dynamometer 1 according to the invention. The example embodiment according to FIG. 3 differs from the preceding example embodiments in that the rotor 3 is made in two parts, namely the rotor head 3a and a rotor ring 3b, such that the rotor head 3a and the rotor ring 3b each have a radial circumference change in that, as shown, they taper in an area of an axial middle of the rotor. Correspondingly, the embodiment shown in FIG. 3 requires only two slide bearings 13, 14 which are in the form of conical bearings 13, 14 and are arranged on the conical surfaces of the rotor. In this example the conical bearings 13, 14 are in the form of hydrostatic slide bearings 13, 14. Since the rotor tapers conically in an axial middle area, the pressure action lines perpendicular to the cone extend outward. Thus, the two conical bearings form an O-arrangement which can absorb torques particularly well.

The example embodiment of FIG. 3 too enables the advantages already mentioned in connection with the embodiments of FIGS. 1 and 2 due to the rigid structure of the wheel-force dynamometer 1.

INDEXES

1 Wheel-force dynamometer
2 Vehicle wheel
2a Vehicle tire
2b Wheel rim
3 Rotor
3a Rotor head
3b Rotor ring
4 Collar
5 Housing
5a Housing body
5b Housing lid
5c Opening
6 Force sensor
7 Supporting structure
8 Slide bearing
9 Slide bearing
10 Slide bearing
11 Wheel flange adapter
12 Centering ring
13 Slide bearing
14 Slide bearing
15 Hollow stud

The invention claimed is:

1. A wheel-force dynamometer for measurement of force and torque, via force sensors, that act upon a vehicle tire and a vehicle wheel,
   the vehicle wheel being mounted to rotate about a rotational axis by way of a wheel axle,
   the wheel axle being designed as a rotor, the rotor is connected to the vehicle wheel in a rotationally fixed manner, the rotor is mounted axially fixed and circumferentially rotatable in a rigid and positionally fixed housing, the housing has a housing body and a housing lid that are fixed to each other such that the rotor is axially fixed therebetween relative to the housing.

2. The wheel-force dynamometer according to claim 1, wherein the rotor has an outer collar that is clamped between the housing body and the housing lid.

3. The wheel-force dynamometer according to claim 2, wherein the rotor comprises a rotor head and a rotor ring, such that the rotor head and the rotor ring each have a radial circumference change, in an axial middle area of the rotor, so that the rotor head and the rotor ring either taper or grow thicker in a manner of a cone.

4. The wheel-force dynamometer according to claim 3, wherein the housing lid of the housing has an opening through which the rotor head passes.

5. The wheel-force dynamometer according to claim 1, wherein the housing body is held by a positionally fixed supporting structure.

6. The wheel-force dynamometer according to claim 1, wherein the force sensors are arranged between the housing body and a supporting structure.

7. The wheel-force dynamometer according to claim 1, wherein the wheel-force dynamometer also comprises slide bearings which are arranged between the rotor and the housing.

8. The wheel-force dynamometer according to claim 7, wherein a first slide bearing is in a form of a radial bearing and a second and a third slide bearing are each in a form of an axial bearing.

9. The wheel-force dynamometer according to claim 7, wherein a first and a second slide bearing are in a form of conical bearings.

10. The wheel-force dynamometer according to claim 7, wherein the slide bearings are in a form of hydrostatic slide bearings.

11. The wheel-force dynamometer according to claim 8, wherein the first slide bearing is arranged either on a radial surface of the rotor or on a radial surface of a collar, and the second and the third slide bearings are arranged on opposite axial end surfaces of the collar.

12. The wheel-force dynamometer according to claim 3, wherein the rotor head of the rotor is connectable, in a rotationally fixed manner, to the vehicle wheel by way of wheel flange adapters.

13. The wheel-force dynamometer according to claim 1, wherein the housing has a housing body and the rotor has an outer collar, and the housing body has a hollow stud which engages in the rotor at least in an area of the collar.

14. The wheel-force dynamometer according to claim 3, wherein a centering ring is arranged on the rotor head of the rotor.

15. A wheel-force dynamometer comprising force sensors for measuring force and torque that act upon a vehicle tire and a vehicle wheel, the vehicle wheel being fixed to a rotor such that the vehicle wheel and the rotor rotate in unison around a rotational axis, the rotor being mounted in a housing that is rigid and fixed in position, the housing has a housing body and a housing lid that are fixed to each other such that the rotor is axially fixed and rotatable therebetween with respect to the housing.

* * * * *